July 30, 1963 LE ROY S. DE MART 3,099,434
POWER-OPERATED STUD TENSIONER
Filed Oct. 26, 1959 2 Sheets-Sheet 2
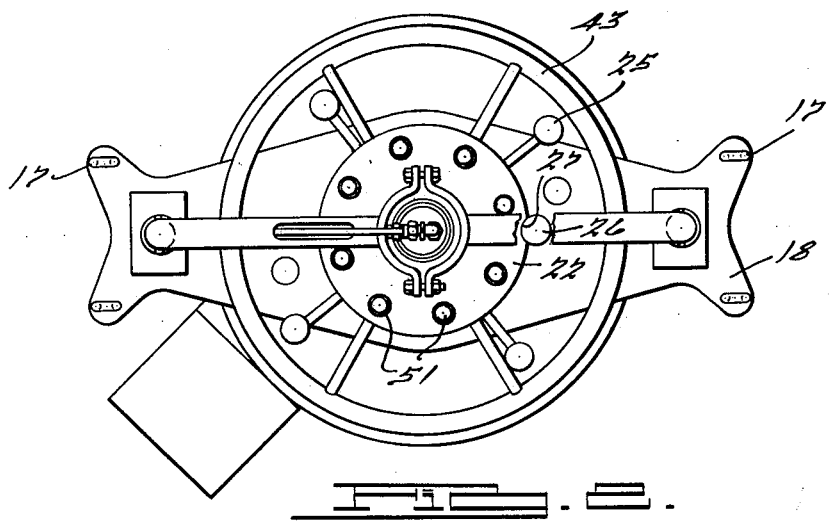
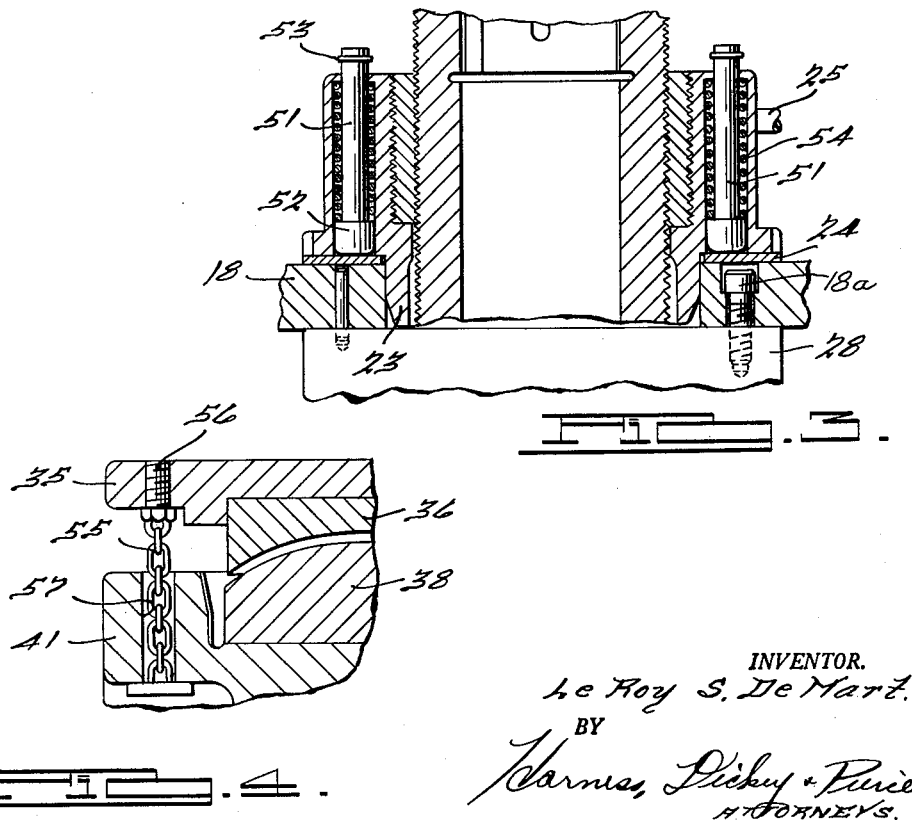
INVENTOR.
Le Roy S. De Mart.
BY
Barnes, Dickey & Pierce
ATTORNEYS.

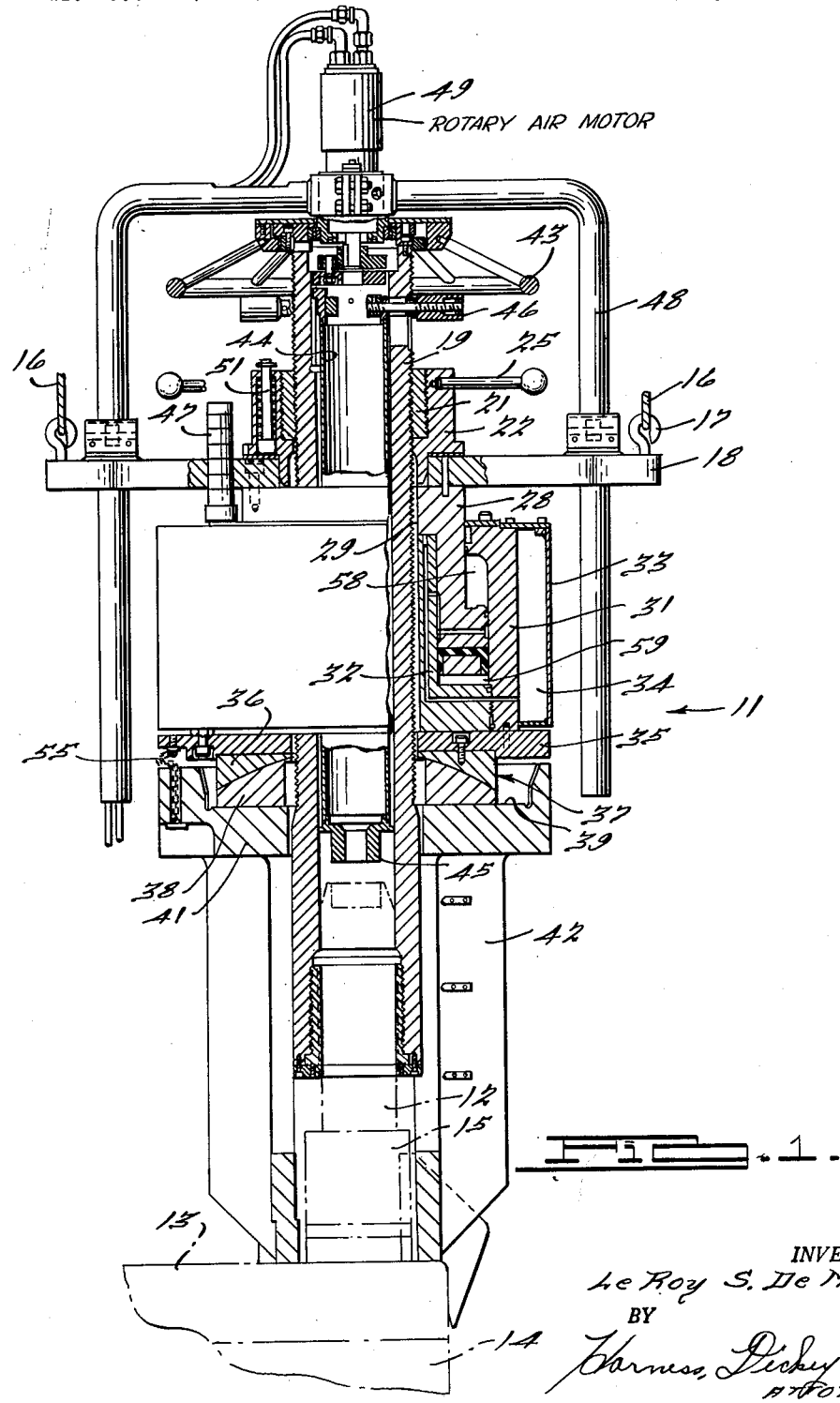

3,099,434
POWER-OPERATED STUD TENSIONER
Le Roy S. De Mart, Lancaster, Ohio, assignor, by mesne assignments, to Babcock & Wilcox Company, a corporation of New Jersey
Filed Oct. 26, 1959, Ser. No. 848,848
15 Claims. (Cl. 254—29)

This invention relates to stud tensioners, and more particularly to means for facilitating the location of such devices and their engagement with the studs.

In the use of stud tensioners for applying a tensile force to studs or bolts for nut setting, or in the removal or replacement of studs, a serious problem is encountered with respect to proper location of the tensioner as well as smooth engagement and disengagement between the tensioner and stud threads. This is especially true with relatively large and unwieldy stud tensioners which are used in conjunction with large diameter studs for heavy pressure vessels.

It is an object of the present invention to provide novel and improved means for interconnecting the various components of a stud tensioner in such a manner as to facilitate positioning of the assembly prior to stud engagement as well as to minimize the danger of thread damage during initial engagement or final disengagement of the stud threads by the tensioner.

It is another object to provide an improved construction of the above character in which the pedestal portion of a stud tensioner which engages the vessel cover may be automatically centered with respect to the other tensioner components each time the assembly is transferred between studs.

It is a further object to provide an improved stud tensioner construction having the above characteristics and preventing binding of the parts during threading of the tensioner drawbar onto the stud which might otherwise be caused by variations between the thread pitches on the drawbar and stud.

It is also an object to provide an improved stud tensioner construction of this nature which does not interfere with any of the normal functions of the tensioner unit and may be easily adjusted for use in situations where a stud tensioner assembly is being used to remove a stud from its mounting hole.

Other objects, features, and advantages of the present invention will become apparent from the subsequent description, taken in conjunction with the accompanying drawings.

In the drawings:

FIGURE 1 is a side elevational view of a stud tensioner incorporating the principles of the invention, parts being in section for clarity;

FIGURE 2 is a top plan view of the tensioner showing the locations of the spring mounts;

FIGURE 3 is an enlarged fragmentary side elevational view in cross-section of a portion of FIGURE 1 showing the spring mounting construction; and FIGURE 4 is an enlarged fragmentary cross-sectional view in elevation of a portion of FIGURE 1 showing the flexible link connection between the pedestal and cylinder base.

In general terms, the invention comprises a stud tensioner having a pedestal adapted to engage a vessel cover and a drawbar threadably connectable to a stud extending through the cover. A piston and cylinder motor is disposed between the drawbar and pedestal in such a manner as to be capable of exerting pressure on the pedestal and tension on the drawbar, in order to elongate a stud so that its nut may be hand tightened and the stud tension then released by the motor. A thrust nut is positioned so as to be capable of transmitting force between the motor piston to the drawbar, and a plurality of spring mounts are disposed between the thrust nut and piston, these spring mounts serving to support the weight of the thrust nut, drawbar and attachments. The limited amount of free motion permitted by this floating spring suspension permits the operator to align the threads of the drawbar and stud during the engaging operation. Means are provided for locking out the spring suspension when it is desired to use the stud tensioner for stud removal so that the heavy weight of the stud will not damage the vessel threads.

The base plate of the motor cylinder is connected to the top of the pedestal by a spherical bearing so that the cylinder and drawbar may be tilted with respect to the pedestal in order to align the drawbar with the stud. A connection comprising a plurality of flexible links exists between the base plate and pedestal top, this connection permitting turning of the spherical bearing and also permitting slight separation of the bearing elements. In this manner, the pedestal may initially be brought to rest on the vessel flange even though it is not exactly centered with respect to the stud, and the drawbar tilted or moved laterally until proper engagement is had with the stud. The cylinder and pedestal may then be lifted with respect to the drawbar, the pedestal centering itself by means of its own weight so that it again may be lowered into a stable position in engagement with the vessel cover.

Referring more particularly to the drawings, the stud tensioner is generally indicated at 11 and is adapted to tension a stud shown in dot-dash lines at 12. This stud may be one of a plurality of studs extending through the cover 13 of a pressure vessel 14. In cases where the vessel is large and intended to contain high pressures, the studs 12 may be of extremely large diameter and great weight. The studs are provided with nuts 15 threaded thereon. In order that nuts 15 exert the required force on cover 13 of the pressure vessel, stud tensioner 11 is used to tension each stud in succession so that its nut 15 may be hand tightened or tightened by wrench pressure. After release of the stud tension, nut 15 will then exert the proper amount of force on cover 13.

Because of the great forces required to tension studs 12, stud tensioner 11 may be of relatively great weight; a typical model, for example, might weigh about two and one-half tons. In order to transport the stud tensioner between studs, a mobile carriage (not shown) may be installed above vessel 14 which suspends tensioner 11 by a plurality of cables 16 connected to eyes 17 which are carried by a hanger plate 18 at the upper portion of the stud tensioner.

The tensioner comprises a drawbar 19 of generally tubular shape which is internally threaded for engagement with stud 12. A major portion of drawbar 19 is externally threaded, and a bushing 21 carried by a thrust nut 22 is threadably mounted on the upper portion of drawbar 19. Hanger plate 18 has a central apertured portion which receives a downwardly extending portion 23 of thrust nut 22, and a washer 24 rests on hanger plate 18 and surrounds this apertured portion. Hanger plate 18 is adapted to engage the lower surface of thrust nut 22 when the hanger plate is moved upwardly, the connection between these parts being described below in further detail. Thrust nut 22 has a plurality of outwardly extending handles 25 and is normally rotatable with respect to hanger plate 18. A lock pin 26 is reciprocally mounted in hanger plate 18 as seen in FIGURE 2, and is movable between a retracted position and a locking position in which its head enters a recess 27 in the outer edge of thrust nut 22, so as to prevent relative rotation between the thrust nut and hanger plate. The internal threads of bushing 21 match the external threads of drawbar 19 which correspond in pitch to the internal threads thereof, that is, with the threads of stud 12.

Hanger plate 18 is supported by a piston 28 of annular shape which surrounds drawbar 19 and has a central aperture 29 of sufficient diameter to permit rocking of the drawbar with respect to the piston. Hanger plate 18 is connected to piston 28 by bolts 18a, as seen in FIGURE 3. Piston 28 is slidably mounted within a cylinder 31 and extends through the upper end thereof. Cylinder 31 is also of annular shape, having an inner portion 32 the internal diameter of which permits rocking motion of drawbar 19. The outer portion of cylinder 31 is surrounded by a cylindrical plate 33 forming a reservoir 34 for the retention of hydraulic fluid used to actuate piston 28.

The lower end of cylinder 31 carries a bearing plate 35 of annular shape, and a concave element 36 of a spherical bearing generally indicated at 37 is secured to the underside of plate 35. The convex bearing element 38 of bearing 37 is supported in a recess 39 of a pedestal 41, this pedestal having a plurality of legs 42 and being adapted to engage cover 13 at its lower end. Elements 35, 36, 38 and 41 are all provided with central clearance apertures for drawbar 19 which will permit rocking motion thereof.

Several additional components of stud tensioner 11 are illustrated in FIGURE 1 and, while in themselves not forming part of the present invention, are described for a further understanding of the unit. An impact wheel 43 is mounted at the upper end of drawbar 19 and has a lost motion connection therewith so that the drawbar may be rotated when desired, for example, when removing a stud. A tubular retractor bar 44 is slidably disposed within drawbar 19 and carries a key 45 at the lower end thereof insertable in a hexagonal recess which may be provided in stud 12. Tubular member 44 is non-rotatably connected to drawbar 19 by means of handles 46 so that the retractor bar may be raised and lowered as desired. An indicating pin 47 is mounted on the upper end of cylinder 31 and extends through an aperture in hanger plate 18, this pin being marked so as to indicate the relative positions of the hanger plate and cylinder. A torque bar 48 of inverted U-shape is secured to the upper end of drawbar 19, the legs of this torque bar extending downwardly through apertured portions in hanger plate 18 so as to prevent undesired relative torsional movement of the parts during operation. An air operated motor 49 is mounted at the upper end of the assembly and may be used to drive drawbar 19 in either direction.

The engagement between thrust nut 22 and hanger plate 18 includes a plurality of spring pressed plungers 51 FIGURE 3, slidably disposed within circumferentially spaced apertures in the thrust nut. Eight such pins are shown in the illustrated embodiment although a different number could be used if desired. Each pin has a lower head portion 52 engageable with washer 24 and a retaining ring 53 at its upper end. A helical compression spring 54 surrounds each plunger 51 and urges the plunger downwardly. The number and strength of springs 54 is preferably such as to support or float the combined weight of the thrust nut, drawbar and its attachments. In a typical installation, the free vertical motion provided by pins 51 and springs 54 may be about ½".

A plurality of chains 55 serve to connect base plate 35 of cylinder 31 and the upper portion of pedestal 41. The upper end of each chain 55 (three chains are provided in the illustrated embodiment though only one is visible in the drawings) is secured in an aperture 56, and the chains extend through equally circumferentially spaced bores 57 in the upper end of the pedestal. The length of chains 55 is such that a slight amount of separation is possible between the two members 36 and 38 of spherical bearing 37. Flexible cables could be substituted for the chains as illustrated, these connections being sufficiently strong to support the weight of pedestal 41.

In operation, assuming that it is desired to move stud tensioner 11 into position over a stud 12 and to thread drawbar 19 onto this stud for tensioning purposes, the tensioner will be lifted by means of cables 16 and placed into position above the stud. Thrust nut 22 will be locked by pin 26, FIGURE 2 to hanger plate 18. Drawbar 19 may be moved to a retracted position by rotating it within thrust nut 22 so that it will clear the top of the stud when the tensioner is lowered. At this time, springs 54 will be in their expanded position so that the weight of thrust nut 22, drawbar 19 and its connected parts will be supported by the springs, with plungers 51 extending slightly outwardly of the thrust nut. By means of the carriage (not shown) supporting cables 16, the tensioner may then be lowered until the lower end of pedestal 41 rests on the surface of cover 13. Drawbar 19 may then be lowered by rotation of airmotor 49 until its threads are adjacent the top thread of stud 12. The first thread of the drawbar may then be turned to contact the first thread of the stud by bearing down on impact wheel 43 and moving the bottom of the drawbar laterally as required to initiate the engagement. It should be noted that this action will be permitted by the floating suspension afforded by springs 54 and the lateral or pitching motion which spherical bearing 37 allows, with flexible connections 55 not interfering with this movement. After the threads have been initially engaged, the drawbar may be run down onto the stud by means of motor 49. Pedestal 41 may then be lifted off cover 13 by forcing fluid into the upper chamber 58 of cylinder 31. The tensioner will then position itself by means of its own gravity concentrically with respect to drawbar 19 which is attached to stud 12. The pedestal may then be lowered by applying hydraulic fluid to lower chamber 59 of cylinder 31, and the feet or pads of pedestal 41 will come to rest flush against cover 13. The tensioner will thus be in a stable condition and ready to stretch the stud to the desired tensile stress by forcing piston 28 out of cylinder 31. It should be observed that this action will occur when the tensioner is applied to each stud so that the pedestal will automatically center itself relative to the remainder of the tensioner as it is transferred from stud to stud.

Another advantage of the spring suspension described above becomes evident during the process of obtaining full thread engagement by running the drawbar down onto the stud. The floating arrangement will prevent binding of the parts during this phase of the operation which might be caused by variations or differences between the thread pitches on the drawbar and stud, respectively.

Should it be desired to remove the stud using retractor bar 44, it will ordinarily be deemed necessary to lock out the drawbar spring suspension. Otherwise, the heavy weight of the stud would bear progressively on fewer and fewer threads as it is unscrewed from the vessel flange so that the last few threads could be damaged by the pressure. To lock out the suspension after the drawbar has been threaded onto the stud but before torque is applied, thrust nut 22 is unlocked from hanger plate 18 by retracting pin 26, and the thrust nut is then turned relative to the drawbar so that it is tightened onto hanger plate 18 until springs 54 are compressed and the thrust nut firmly engages washer 24. With key 45 of rectractor bar 44 entered into the recess in the upper end of stud 12, the stud may then be removed (thrust nut 22 having been again locked to hanger plate 18) by rotation of drawbar 19.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a stud tensioning device, a threaded drawbar adapted to be threadably connected to a stud, a reciprocable motor for urging said drawbar in a direction away from said stud, said drawbar and motor being spaced apart in a direction transverse to the drawbar axis whereby said drawbar may move laterally with respect to said motor and spring suspension means between said motor and said drawbar and adapted to support the weight of said drawbar in its unrestrained condition.

2. In a stud tensioning device, a drawbar having one end adapted to be connected to a stud, a thrust nut threadably mounted on said drawbar, means separate from said drawbar for urging said thrust nut in a direction away from said stud, said drawbar and said last-mentioned means being spaced apart in a direction transverse to the drawbar axis whereby said drawbar may move laterally with respect to said last-mentioned means, and spring suspension means carried by said thrust nut and engageable with said last-mentioned means, said spring suspension means having sufficient strength to support the weight of said thrust nut and drawbar in their unrestrained condition.

3. In a stud tensioning device, a drawbar having one end adapted to be connected to a stud, a pedestal adapted to rest on a vessel cover, said pedestal and drawbar being spaced apart in a direction transverse to the drawbar axis whereby said drawbar may move laterally with respect to said pedestal, means between said pedestal and drawbar and adapted to urge the drawbar away from said stud, and spring suspension means disposed between said last-mentioned means and said drawbar and adapted to support the weight of said drawbar in its unrestrained condition.

4. The combination according to claim 3, said spring suspension means including a thrust nut threadably mounted on said drawbar, and a plurality of spring-urged plungers slidably mounted in said thrust nut and engageable with said connecting means.

5. In a stud tensioning device, a pedestal, piston and cylinder members, one of said members being mounted on said pedestal, a drawbar extending through said piston and cylinder members and said pedestal, the piston and cylinder members and pedestal having central clearance apertures for permitting limited lateral movement of said drawbar, and spring suspension means between the other of said members and said drawbar, said spring suspension means being adapted to support the weight of said drawbar in its unrestrained condition.

6. In a stud tensioning device, a pedestal adapted to engage a vessel cover, a cylinder supported by said pedestal, a piston slidable within said cylinder and extending upwardly therefrom, a drawbar extending through said piston and cylinder and said pedestal and adapted to threadably engage a stud, said pedestal and drawbar being spaced apart in a direction transverse to the drawbar axis whereby said drawbar may move laterally with respect to said pedestal, and spring suspension means between said drawbar and the upper end of said piston and adapted to support the weight of said drawbar when in its unrestrained condition.

7. In a stud tensioning mechanism, a drawbar, a thrust nut threadably mounted on said drawbar, means at one end of said drawbar for threadably engaging a stud, means for urging said thrust nut in a direction away from said stud, selectively movable locking means for preventing relative rotation between said thrust nut and said urging means, and spring suspension means between said thrust nut and said urging means and adapted to support the weight of said thrust nut and drawbar when in their unrestrained condition.

8. In a stud tensioning device, a drawbar having one end adapted to threadably engage a stud, a thrust nut threadably mounted on said drawbar, piston and cylinder means adapted to urge said thrust nut away from said stud, spring suspension means between said thrust nut and piston and cylinder means, and means for locking said thrust nut against rotation relative to said piston and cylinder means.

9. In a stud tensioning device, a pedestal, a piston and cylinder assembly supported by said pedestal, a plurality of flexible links connecting said pedestal with said piston and cylinder assembly, said flexible links permitting limited lateral motion of said pedestal relative to said piston and cylinder assembly, a drawbar extending through said piston and cylinder assembly and pedestal and adapted to threadably engage a stud, and means between said drawbar and said piston and cylinder assembly and adapted to urge said drawbar away from said stud.

10. The combination according to claim 9, said last-mentioned means comprising a spring suspension adapted to support the weight of said drawbar when in its unrestrained condition.

11. The combination according to claim 9, further provided with a spherical bearing between said piston and cylinder assembly and said pedestal, said flexible links being of sufficient length to permit rocking of said piston and cylinder assembly on said pedestal by means of said spherical bearing.

12. In a stud tensioning device, a pedestal, a piston and cylinder assembly mounted on said pedestal, a spherical washer connecting said piston and cylinder assembly with said pedestal, a plurality of flexible links connecting said piston and cylinder assembly with said pedestal and being of sufficient length to permit rocking motion on said spherical bearing, a drawbar extending through said piston and cylinder assembly and pedestal and adapted to engage a stud, a thrust nut on said drawbar, and a plurality of plungers slidably mounted in said thrust nut and spring-urged toward said piston and cylinder assembly, said spring-urged plungers being adapted to support at least a substantial portion of the weight of said drawbar and thrust nut when in their unrestrained condition.

13. The combination according to claim 12, further provided with a hanger plate disposed between said piston and cylinder assembly and said thrust nut and secured to said piston and cylinder assembly, and means for locking said thrust nut to said hanger plate for preventing rotation of the thrust nut relative to said piston and cylinder assembly.

14. In a stud tensioning device, a pedestal adapted to engage a vessel cover, a cylinder supported by said pedestal, a piston slidable within said cylinder and extending upwardly therefrom, a drawbar extending through said piston and cylinder and said pedestal and adapted to threadably engage a stud, spring suspension means between said drawbar and the upper end of said piston and adapted to support the weight of said drawbar when in its unrestrained condition, a spherical bearing connecting said cylinder and said pedestal, and a plurality of flexible links extending between said cylinder and pedestal, said links being of sufficient length to permit limited rocking movement of said cylinder with respect to said pedestal on said spherical bearing.

15. The combination according to claim 14, said piston, cylinder, spherical bearing and pedestal having central clearance apertures for permitting limited rocking motion of said drawbar.

(References on following page)

References Cited in the file of this patent

UNITED STATES PATENTS

| | | |
|---|---|---|
| 1,597,549 | Siegel | Aug. 24, 1926 |
| 2,197,808 | Mason | Apr. 23, 1940 |
| 2,542,665 | Gustafson | Feb. 20, 1951 |
| 2,631,485 | Stuart et al. | Mar. 17, 1953 |
| 2,728,978 | Birkenmaier et al. | Jan. 3, 1956 |
| 2,736,219 | May | Feb. 28, 1956 |
| 2,756,622 | La Belle | July 31, 1956 |
| 2,760,393 | Stough | Aug. 28, 1956 |
| 2,820,382 | Smith | Jan. 21, 1958 |
| 2,866,370 | Biach | Dec. 30, 1958 |
| 2,885,919 | Carlson | May 12, 1959 |
| 2,889,729 | Orner | June 9, 1959 |
| 2,899,855 | Neville | Aug. 18, 1959 |